United States Patent [19]

Inoue

[11] Patent Number: 4,941,962
[45] Date of Patent: Jul. 17, 1990

[54] ELECTROSTATIC ADSORPTIVE FLUID FILTERING APPARATUS

[75] Inventor: Noboru Inoue, 2-14-24, Asahicho, Takasagocho, Takasago-shi, Hyogo-ken, Japan

[73] Assignee: Noboru Inoue, Takasago, Japan

[21] Appl. No.: 201,373

[22] Filed: May 31, 1988

Related U.S. Application Data

[63] Continuation of Ser. No. 873,040, Jun. 12, 1986, abandoned.

[30] Foreign Application Priority Data

Jun. 17, 1985 [JP] Japan .................................. 60-131328

[51] Int. Cl.⁵ ...................... B01D 15/00; B01D 35/06; B03C 3/00
[52] U.S. Cl. ..................................... 204/302; 55/124; 55/131; 55/137; 55/139; 210/243
[58] Field of Search ..................... 210/243, 502.1, 748, 210/457; 55/110, 111, 120, 123, 124, 136, 138, 150, 155, DIG. 38, 137, 131, 139; 204/299 R, 302

[56] References Cited

U.S. PATENT DOCUMENTS

| | | | |
|---|---|---|---|
| 2,974,747 | 3/1961 | Coolidge, Jr. et al. | 55/124 |
| 3,438,180 | 4/1969 | Klouda | 55/124 |
| 3,841,840 | 10/1974 | Hundhausen et al. | 55/124 |
| 3,933,643 | 1/1976 | Colvin et al. | 210/243 |
| 4,013,554 | 3/1977 | Reis et al. | 210/243 |
| 4,244,710 | 1/1981 | Burger | 55/138 |
| 4,269,681 | 5/1981 | Watson et al. | 204/302 |
| 4,294,697 | 10/1981 | Sawa et al. | 210/243 |
| 4,601,799 | 7/1986 | Froberger et al. | 204/302 |
| 4,620,917 | 11/1986 | Nozawa et al. | 210/748 |

FOREIGN PATENT DOCUMENTS

| | | | |
|---|---|---|---|
| 0032317 | 7/1981 | European Pat. Off. | 210/243 |
| 0049454 | 4/1982 | European Pat. Off. | 55/124 |
| 2658510 | 6/1978 | Fed. Rep. of Germany | 55/124 |
| 1029116 | 5/1953 | France | 55/124 |
| 4530400 | 10/1970 | Japan | 55/124 |
| 0162276 | 12/1979 | Japan | 55/124 |

*Primary Examiner*—Ivars Cintins
*Attorney, Agent, or Firm*—Jones, Tullar & Cooper

[57] ABSTRACT

An electrostatic adsorptive fluid filtering apparatus wherein an adsorbent provided in a flow path of fluid to be treated has adsorption capacity as well as adsorption power substantially improved as a result of enhancement of a potential inherently carried by the adsorbent on its adsorptive hole surface by impressing a DC or DC/AC voltage onto a charging electrode provided with the adsorbent or by placing the adsorbent in an electric field. The apparatus includes an outer cylindrical electrode, a charging electrode within the outer cylindrical electrode, a central electrode, the adsorbent and a source of the electrical voltage connected to the outer cylindrical electrode, the charging electrode and the central electrode. The DC or DC/AC voltage is impressed across the outer cylindrical electrode and the charge electrode, on one side, with the voltage on the charging electrode and the outer cylindrical electrode being at the same potential while fluid under pressure is introduced through an inlet in the outer cylindrical electrode to a fluid receiving space defined by the outer cylindrical electrode and the charging electrode.

10 Claims, 7 Drawing Sheets

ELECTROSTATIC ADSORPTIVE FLUID FILTERING APPARATUS

This is a continuation of co-pending application Ser. No. 873,040 filed on June 12, 1986, now abandoned.

BACKGROUND OF THE INVENTION

The present invention relates to a fluid filtering apparatus adapted for removal of various noxious gases such as chlorine gas and ammonium gas or noxious ions present in the air; ions, moisture or molecular impurities present in non-aqueous liquids such as lubricating oil, machining oil, cleaning oil and organic solvents; and oily contents, ions or molecular impurities present in aqueous liquids such as potable water, waste water, lubricating liquid, working water and cleaning liquid, and more particularly to such fluid filtering apparatus utilizing adsorbent.

In the conventional adsorptive fluid filtering apparatuses utilizing adsorbent, the fluid to be treated passes through the apparatus merely in contact with the adsorbent or passes first through an electric field so that any impurities contained therein are charged and then passes in contact with the adsorbent. Such adsorptive filtering apparatuses of prior art have been unsatisfactory in their adsorption capacities and also because of the limited saturated adsorption levels of used adsorbents, since these well known apparatuses exclusively rely upon a relatively low inherent adsorption potential of the adsorbent on its effective hole surface as an adsorption power. Additionally, after saturation, the adsorbent can not be reused and must be thrown away. This disadvantageously increases the operation cost and requires a large-sized waste disposal equipment.

The present invention is based on a surprising revelation that the adsorption of impurities or the like onto the adsorbent is caused not by physical capillarity, as would be expected based on established theory, but really by a mutual attraction, under effect of a Coulomb's force, between electric charges carried by the adsorbent surface and those carried by impurities or ions.

SUMMARY OF THE INVENTION

An object of the present invention is to provide an electrostatic adsorptive fluid filtering apparatus adapted to improve adsorption power as well as adsorption capacity of an adsorbent by enhancing an inherent adsorption potential of the adsorbent on its adsorptive hole surface so as to increase a Coulomb's force developed between the adsorptive hole surface and matters to be adsorbed thereonto, for example, impurities.

Another object of the present invention is to provide an electrostatic adsorptive fluid filtering apparatus adapted to improve the adsorption power as well as the adsorption capacity of the adsorbent as a result of enhancement of the inherent adsorption potential of the adsorbent on its adsorptive hole surface by impressing as electric voltage onto a charging electrode provided with the adsorbent or onto the adsorbent itself.

Still another object of the present invention is to provide an electrostatic adsorptive fluid filtering apparatus adapted to improve the adsorption power as well as the adsorption capacity of the adsorbent as a result of enhancement of said inherent adsorption potential of the adsorbent onto its adsorptive hole surface by exposing the adsorbent to an electric field.

BRIEF DESCRIPTION OF THE DRAWINGS

FIGS. 1 through 3 illustrate a first embodiment, of which

FIGS. 4 through 6 illustrate a second embodiment, of which

FIGS. 7 and 8 illustrate a third embodiment, of which

FIGS. 9 and 10 illustrate a fourth embodiment, of which FIGS. 11 and 12 illustrate a fifth embodiment, of which

DETAILED DESCRIPTION OF THE PREFERRED EMBODIMENTS

The present invention will be described in more detail hereinafter with respect to the first embodiment illustrated by FIGS. 1 through 3, the second embodiment illustrated by FIGS. 4 through 6, the third embodiment illustrated by FIGS. 7 and 8, the fourth embodiment illustrated by FIGS. 9 and 10, and the fifth embodiment illustrated by FIGS. 11 and 12, successively.

(The First Embodiment)

Figure 1:
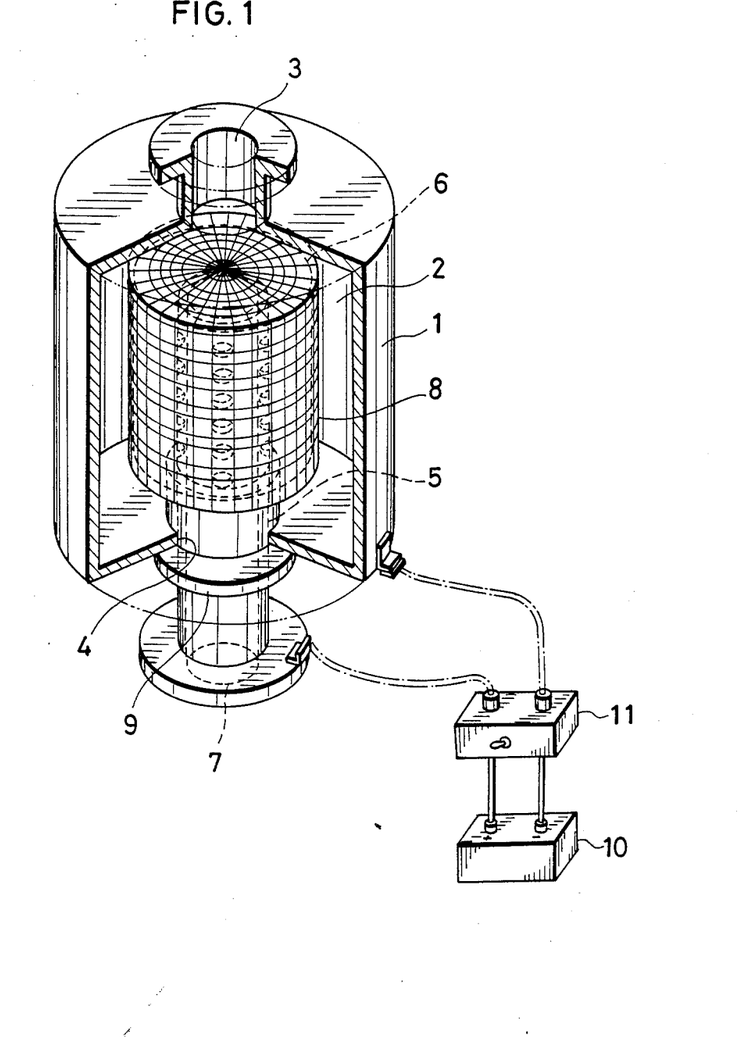
FIG. 1 is a perspective view partially broken to show the interior of the apparatus.
Figure 2:
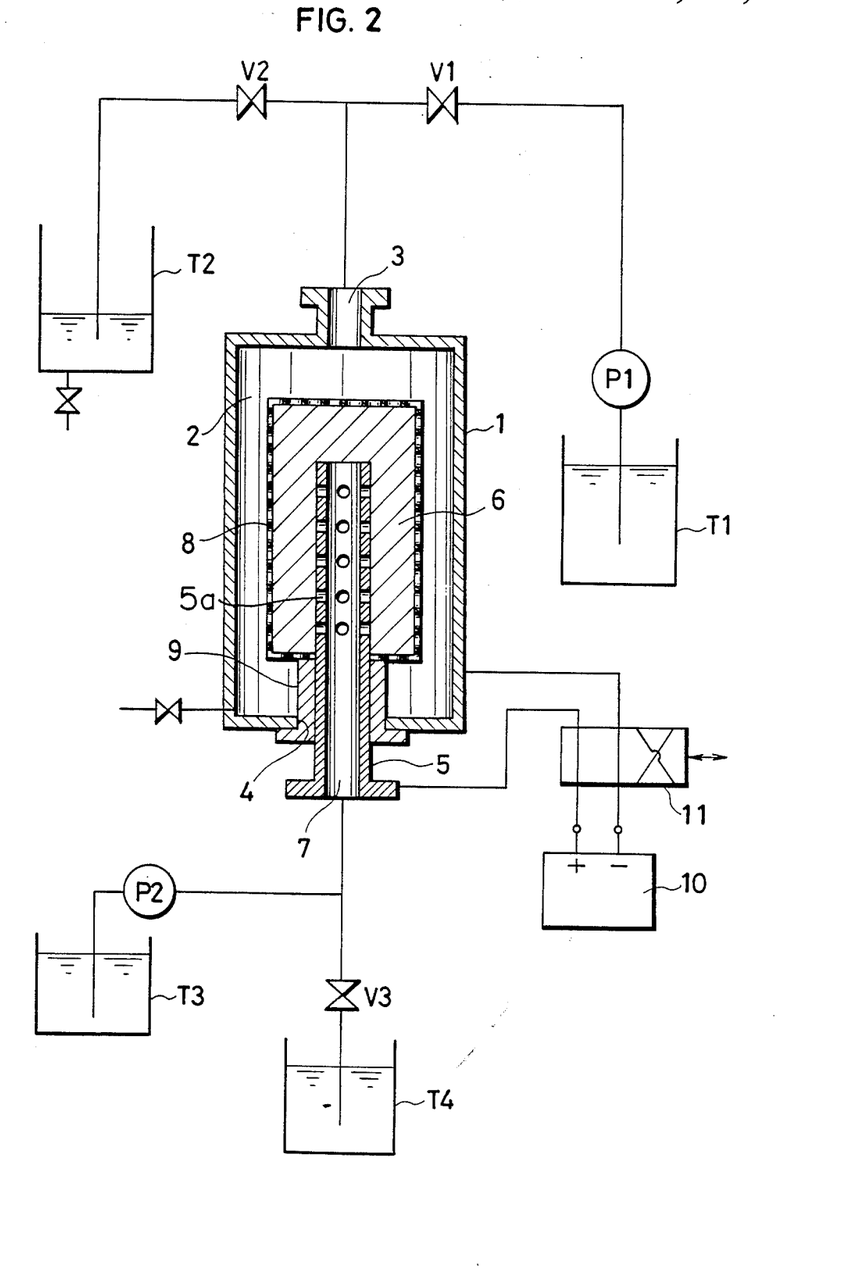
FIG. 2 is a vertical section of the apparatus combined with a diagram illustrating a system of wiring and piping associated with the apparatus itself.
Figures 3, 4:
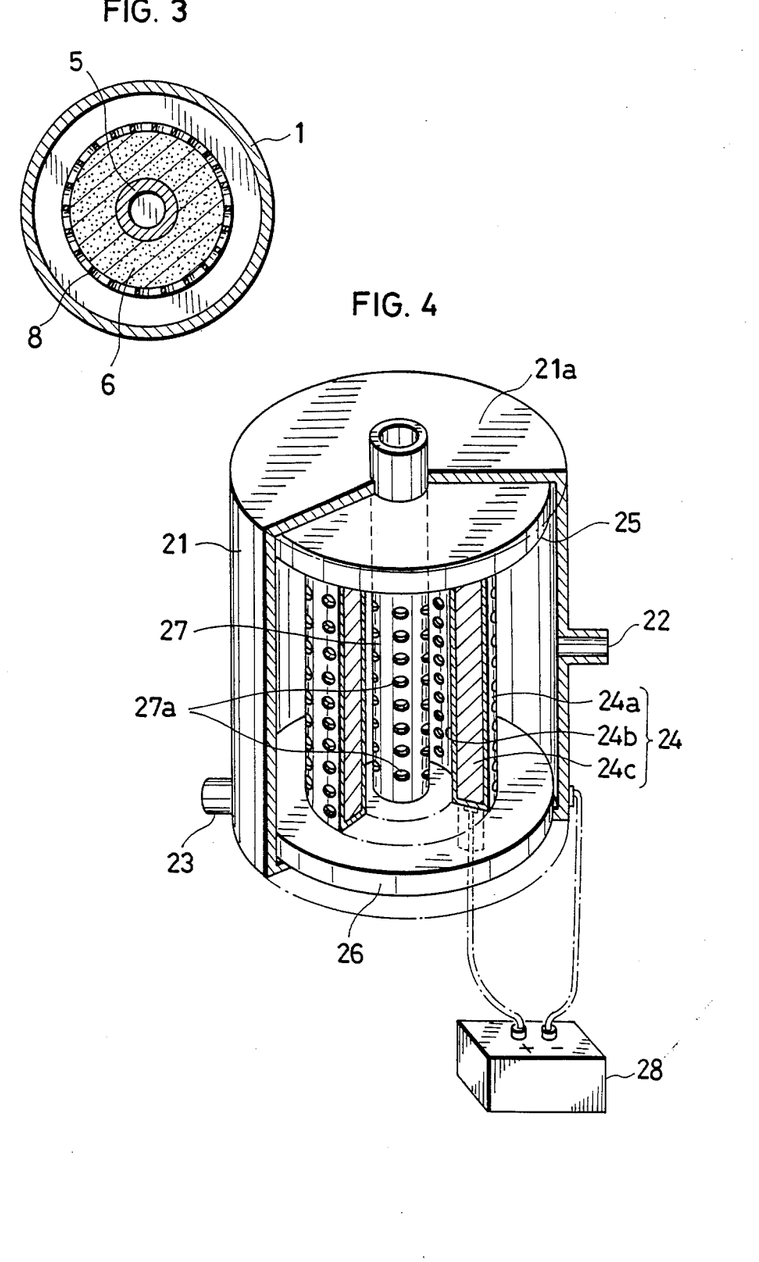
FIG. 3 is a radial cross-section of the apparatus itself.
FIG. 4 is a perspective view partially broken to show the interior of the apparatus.

Referring to FIGS. 1 through 3, reference numeral 1 designates an outer cylindrical electrode having defined therein a slow rate treatment chamber 2 and having at vertically opposite ends an inlet 3 communicating with the slow rate treatment chamber 2 and an electrode bearing opening 4.

Reference numeral 5 designates a charging electrode centrally provided within the outer cylindrical electrode 1 and having a passage axially extending therethrough. The charging electrode 5 has a peripheral wall which is provided adjacent its upper end with a plurality of through-holes 5a and surrounded by an adsorbent layer 6. The peripheral wall has at its opposite, i.e., lower end, an outlet 7.

The adsorbent layer 6 is, in turn, surrounded by a porous or reticulated electric conductor 8 which is electrically connected to the charging electrode 5. It should be noted that the adsorbent constituting the adsorbent layer 6 is selected so that the surface potential on the adsorptive hole thereof has a polarity opposite to that of the surface charge carried by impurities or the like to be removed. Usually, carbonaceous adsorbents are used for gases, adsorbents containing as main ingredients activated clay, zeolite, activated alumina or a mixture thereof are used for non-aqueous liquids, and adsorbents containing therein as main ingredients activated carbon, zeolite or a mixture thereof for aqueous liquids.

Reference numeral 9 designates an insulator carried on the electrode bearing opening 4 of the outer cylindrical electrode 1 to electrically insulate the outer cylindrical electrode 1 from the charging electrode 5 and to fixedly support the portion of the charging electrode 5 covered with the adsorbent layer 6 within the slow rate treatment chamber 2 of the outer cylindrical electrode 1.

Reference numeral 10 designates a DC source having positive and negative terminals. Source lines wired from these terminals are connected via a change-over switch 11 to the outer cylindrical electrode 1 and to the charging electrode 5, respectively, the change-over switch 11 being operable to change-over the polarity of the voltage impressed across the outer cylindrical electrode 1 and the charging electrode 5.

In the first embodiment of the apparatus according to the present invention, a pipe line starting from a reservoir $T_1$ for fluid to be treated extends through a pump $P_1$ and a valve $V_1$, then is branched into two lines, the one communicating with the inlet 3 of the apparatus itself and the other communicating via a valve $V_2$ with a reservoir $T_2$ for impurities. Another pipe line starting from the outlet 7 is also branched into two lines, the one communicating via a pump $P_2$ with a reservoir $T_3$ for flushing purposes and the other communicating via a valve $V_3$ with a reservoir $T_4$ for treated fluid.

Now, the manner in which this embodiment operates will be described. In adsorption treatment, the fluid to be treated is supplied by the pump $P_1$ from the reservoir $T_1$ for fluid to be treated into the slow rate treatment chamber 2 of the apparatus and, after passage through the adsorbent layer 6, discharged through the charging electrode 5 into the reservoir $T_4$ for treated fluid while the conductor 8 surrounding the charging electrode 5 and, therefore, the adsorbent layer 6 is applied with a voltage of a polarity opposite to that of the surface charges of the impurities to be removed.

Upon saturation of the adsorbent layer 6, the change-over switch 11 is operated, the valve $V_1$ of inlet side is closed and the valve $V_2$ in the branched line is opened so as to form a passage leading to the reservoir $T_2$ for impurities, and thereafter, the pump $P_2$ for counter flushing is driven to wash the adsorbed impurities away.

Such operation may be manually or automatically respeated in a continuous manner to treat the fluid containing impurities under the effect of electrostatic adsorption and electrostatic removal.

As has been mentioned above, one of the opposing electrodes is provided with the adsorbent layer which is surrounded by the conductor electrically connected to this electrode and which is comprised of the material selected for the matter to be adsorbed thereonto. The fluid to be treated is guided to pass between these electrodes across which a DC voltage is impressed, and thereby the impurities or the like are adsorbed onto the adsorbent layer having its adsorption capacity improved. More specifically, the adsorbent layer carried by the one electrode has its adsorption surface potential enhanced under the effect of the DC voltage impressed onto the charging electrode and the conductor surrounding the latter. The impurities or the like contained in the fluid guided to pass between the said electrodes are exposed to an electric field and are thereby polarized or charged to increase their quantity of electricity. As a consequence, the Coulomb's force acting between the adsorptive hole surface and the matter to be adsorbed thereonto rapidly increases, so that the matter to be adsorbed is attracted onto the adsorptive hole surface. During this process, the impurities of relatively large sizes and relatively high specific gravities contained in the same fluid have their zeta potentials (due to induced electricity and/or ion bonding) erased as these impurities pass by the surface of the charging electrode. As a result, these impurities cohere together into coarse particles under the effect of van der Waals' force and settle. The remaining impurities which do not settle are attracted by the intensive Coulomb's force as has been mentioned above, into the adsorptive hole, filling the adsorptive hole, and being adsorbed onto the adsorbent. Thus, the surface potential of the adsorbent at its adsorptive hole is enhanced to increase the Coulomb's force acting between the latter and the impurities, enabling the impurities to fill the adsorptive hole. Thus, it will be recognized that it is possible to utilize the adsorbent substantially more effectively than when the charging electrode is applied with no DC voltage. This results in an increase of the adsorbed quantity and prolongation of the useful life of the adsorbent.

When the adsorbent is saturated, the change-over switch 11 may be operated so as to change-over the polarity of the DC source 10 connected to the outer cylindrical electrode, on one side, and to the charging electrode 5, on the other side, and thereby to generate the Coulomb's force of a reverse polarity with respect to the Coulomb's force acting during the adsorption process as mentioned above.

The voltage supplied from the DC source 10 may be a DC voltage or a DC/AC superposed voltage. Preferably, a DC voltage of 1,000 to 3,000 V/cm is used for gases, a DC voltage of 10 to 200 V/cm for non-aqueous liquids, a DC voltage or DC/AC superposed voltage of 1 to 20 V/cm for aqueous liquids, respectively. It should be noted here, however, that the selection of the DC voltage or superposed voltage to be impressed and the selection of a voltage value depend on the electric resistance specific to the particular fluid and it is desired to select these factors experimentally. Therefore, both the type and the value of the impressed voltage is not limited to those as set forth above.

Additionally, the flow velocity of fluid depends on the viscosity thereof.

Although the adsorbent layer 6 is surrounded by the conductor 8 electrically connected to the charging electrode 5 in this first embodiment as illustrated, when an electrically conductive adsorbent such as activated carbon or activated alumina is employed, the presence of the conductor is sometimes unnecessary since the surface of the adsorbent can be maintained at a potential equal to that of the charging electrode through the adsorbent layer directly in contact with the charging electrode.

(The Second Embodiment)

Figure 5:
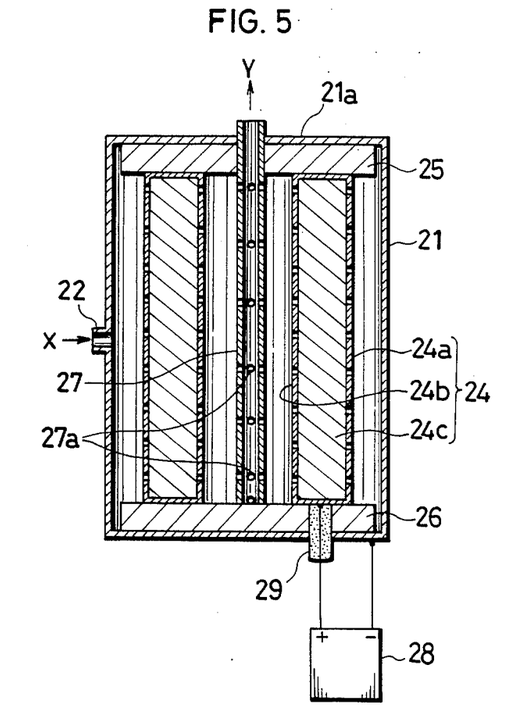
FIG. 5 is a vertical section of the apparatus itself.
Figure 6:
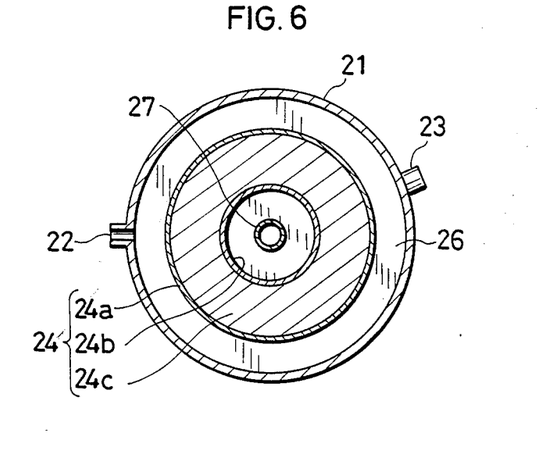
FIG. 6 is a radial cross-section of the apparatus itself.

Referring to FIGS. 4 through 6, the outer cylindrical electrode 21 is in the form of a cylinder closed at opposite ends and provided with a fluid inlet 22 and a drain 23. A charging electrode 24 is disposed concentrically into the outer cylindrical electrode 21 and comprises two concentrically arranged cylindrical conductors 24a, 24b made of porous or reticulated material between which an adsorbent 24c is filled. The type of the adsorbent 24c depends on the fluid and the matter to be adsorbed thereonto. Upper and lower insulator plates 25, 26 serve to insulate and support the charging electrode 24 with respect to the outer cylindrical electrode 21. A central electrode 27 comprises a pipe having a plurality of through-holes 27a and extends into the hollow interior of the charging electrode 24 along the axis of the outer cylindrical electrode 21 and through a top surface 21a of the outer cylindrical electrode 21 and the upper insulator plate 25. An electric source 28 is connected at its one end to the charging electrode 24 through an insulating bushing 29 and at the other end both to the outer cylindrical electrode 21 and the central electrode 27.

Now the manner in which this embodiment operates will be considered. Voltage is impressed onto the fluid flowing between the outer cylindrical electrode 21 and the charging electrode 24 as fluid is supplied under pressure in the direction of arrow X through the fluid inlet 22 into the outer cylindrical electrode 21. The type and value of this voltage are identical to those in the case of the previously mentioned first embodiment. As a consequence, the impurities of relatively large particle sizes and relatively high specific gravities contained in the fluid flowing under pressure between the outer cylindrical electrode 21 and the charging electrode 24 are attracted under the effect of Coulomb's force to the charging electrode 24, then electrophoretically collected around the charging electrode 24 where the zeta potential of these impurities disappears. Thus, these impurities cohere together into coarse particles, then settle down and are discharged through the drain 23. Such settlement of the impurities having relatively large particle sizes prevents the adsorptive hole of the adsorbent 24c from being clogged with the impurities.

The remaining impurities are polarized or ionized under the effect of the impressed voltage, then attracted by the charging electrode 24 and brought into contact with the adsorbent 24c so as to be attracted by the Coulomb's force towards, or adsorbed onto, the potential-enhanced adsorptive hole surface of the adsorbent 24c. In the second embodiment, voltage is impressed also across the charging electrode 24 and the central electrode 27, so any impurities possibly remaining in the fluid which has once passed by the adsorbent 24c will be again polarized or ionized in the region between the charging electrode 24 and the central electrode 27 and adsorbed onto the adsorptive hole surface.

Therefore, the apparatus according to the second embodiment can provide an adsorption capacity higher than provided by the apparatus according to the first embodiment. The fluid thus filtered is discharged through an opening formed in the upper end of the central electrode 27 as indicated by an arrow Y.

As in the first embodiment, the change-over switch provided on the output side of the electric source means 28 is operated to reverse the polarity of the voltage impressed between the outer cylindrical electrode 21 and the charging electrode 24 and thereby to dislodge the matters from the adsorbent 24c so that the adsorbent 24c may be repeatedly reused. Furthermore, the matter which has been adsorbed onto the adsorbent 24c can be collected in a thickened condition.

(The Third Embodiment)

Figure 7:
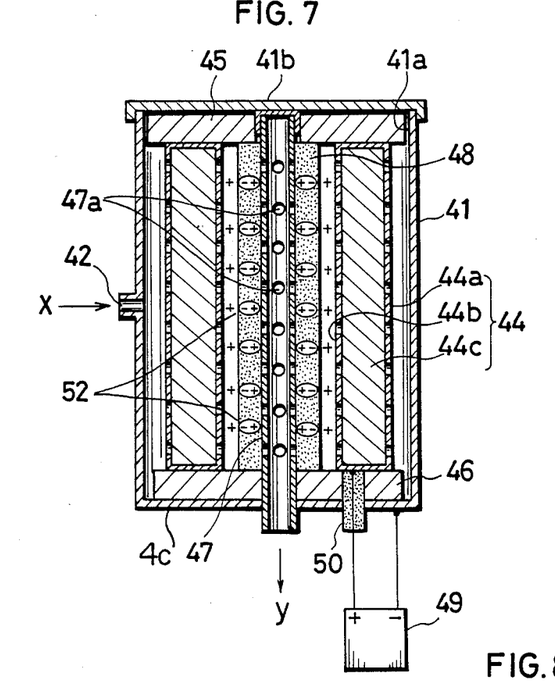
FIG. 7 is a vertical section of the apparatus itself and FIG. 8 is a radial cross-section.
Figure 8:
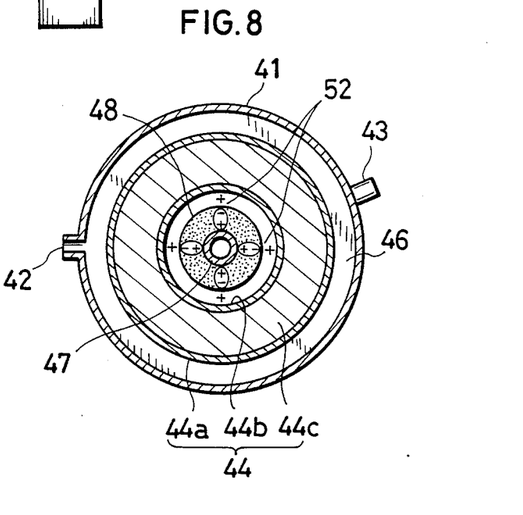

The third embodiment illustrated by FIGS. 7 and 8 is a modification of the above-mentioned second embodiment and similar to the second embodiment except that the outlet for the filtered fluid is provided at the lower end of the central electrode and the latter is surrounded by a filter.

As seen, the outer cylindrical electrode 41 is in the form of a cylindrical container provided with a fluid inlet 42 and a drain 43, and has an upper opening 41a closed with a closure 41b. A charging electrode 44 is, as is the case of the charging electrode 24 in the second embodiment, disposed concentrically within the outer cylindrical electrode 41, and comprises two concentrically disposed cylindrical conductors 44a, 44b made of porous or recticulated material and an adsorbent 44c filling a space defined by these two conductors. Upper and lower insulator plates 45, 46 serve as an insulated support for the charging electrode with respect to the outer cylindrical electrode 41. A central electrode 47 comprises a pipe having a plurality of through-holes 47a, and extends into the hollow interior of the charging electrode 44 along an axis of the outer cylindrical electrode 41 and through the upper insulator plate 45, the lower insulator plate 46, and a bottom wall 41c of the outer cylindrical electrode 41. A filter 48 is made of an electric conductor, arranged to surround the central electrode 47 and supported by the upper and lower insulator plates 45, 46 within the outer cylindrical electrode 41. An electric source 49 is, as is the case of the electric source in the above-mentioned second embodiment, connected at one end to the charging electrode 44 through an insulating bushing 50 and at the other end both to the outer cylindrical electrode 41 and the central electrode 47. The type and the value of the voltage supplied from this electric source 49 are as in the previously mentioned first and second embodiments.

In the apparatus according to the third embodiment of the arrangement as has been described above, the impurities of relatively large particle sizes contained in the fluid introduced under pressure through the fluid inlet 42 as indicated by the arrow X settle down, as in the above-mentioned first and second embodiments, as the fluid passes between the outer cylindrical electrode 41 and the charging electrode 44, and the remaining impurities are adsorbed onto the potential-enhanced adsorptive hole surface of the adsorbent 44c under the effect of a Coulomb's force generated by the enhanced potential. Thus, a desired filtering effect is achieved to a certain degree. Further fine filtering is achieved by the filter 48 interposed between the charging electrode 44 and the central electrode 47. More specifically, any colloidal particles possibly remaining in the fluid after the latter has passed by the adsorbent 44c are attracted by a greater zeta potential developed on the surface of the filter 48 due to the voltage impressed across the charging electrode 44 and the central electrode 47 and thereby adsorbed onto the surface. In this way, such colloidal particles are effectively removed from the fluid. Reference numeral 52 indicates how the filter 48 is polarized to cause the zeta potential. A cake formation occurs on the surface of the filter 48 due to adsorption of the colloidal particles thereonto and serves for a cake-filtration. As a result, a fine filtering effect is maintained even when the fineness of the filter 48 itself has deteriorated, and the filter 48 is always free from being clogged by colloidal particles penetrating into the interior of the filter 48. Thus, the useful life of the filter 48 is prolonged to 5 by 10 times with respect to the case in which the filter 48 is used without any impressed voltage. The fluid thus finely filtered by the filter 48 is discharged through the opening at the lower end of the central electrode 47 as indicated by the arrow Y.

Now an electric field is generated in the passage of the fluid which has passed by the adsorbent 44c, thus enhancing the adsorption capacity, and the filter 48 is placed in this electric field so that the fluid may be further filtered at a fineness or precision substantially higher than that inherent to this filter 48, providing a more effective electrostatic adsorptive fluid filtering apparatus.

(The Fourth Embodiment)

Figure 9:
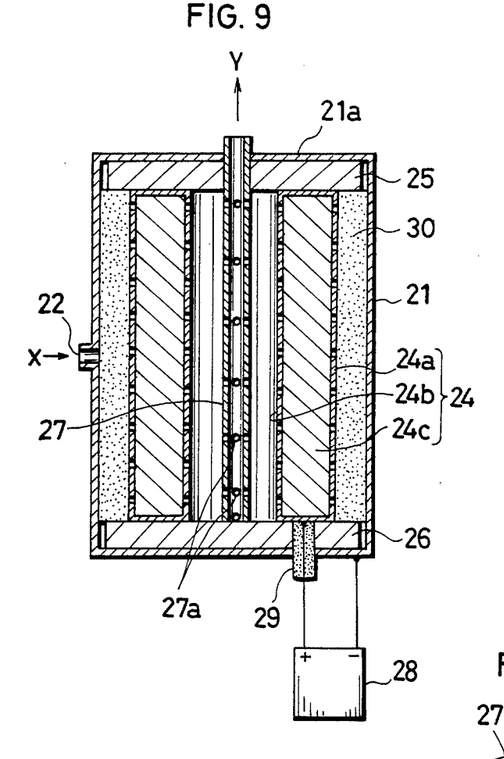
FIG. 9 is a vertical section of the apparatus itself and FIG. 10 is a radial cross-section of the apparatus itself.
Figure 10:
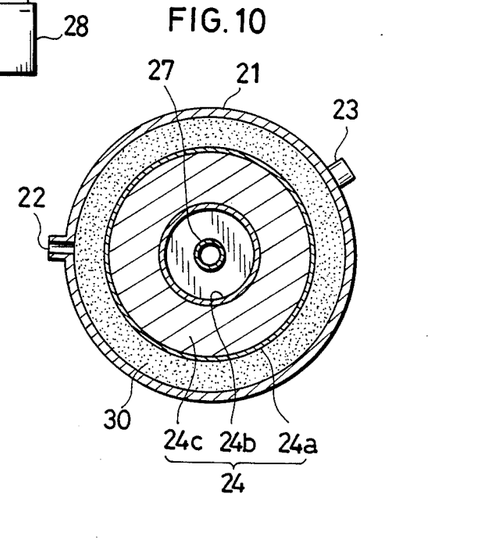

The fourth embodiment illustrated by FIGS. 9 and 10 is distinguished from the second embodiment illustrated by FIGS. 4 through 6 only in that there is provided a dielectric substance between the outer cylindrical electrode 21 and the charging electrode 24. Accordingly, all other parts or components are similar to those in the second embodiment and designated by the same reference numerals. These parts will not be described here in detail.

Referring to FIGS. 9 and 10, a fibrous dielectric substance as made of glass wool is employed to comprise the dielectric substance 30 between the outer cylindrical electrode 21 and the charging electrode 24. The dielectric substance 30 is polarized upon impression of a voltage and this creates a situation equivalent to a plurality of electrodes being interposed between the outer cylindrical electrode 21 and the charging electrode 24. As a consequence, zeta potentials carried by impurities rapidly disappear and thus the impurities of relatively large particle sizes will reliably settle down, so that a probability at which the adsorptive holes of the adsorbent 24c might be clogged with impurities may be reliably reduced.

Interposition of the dielectric substance between the outer cylindrical electrode and the charging electrode as in this fourth embodiment may be effectively employed also in other embodiments (i.e., the first embodiment and the third embodiment).

(The Fifth Embodiment)

Figure 11:
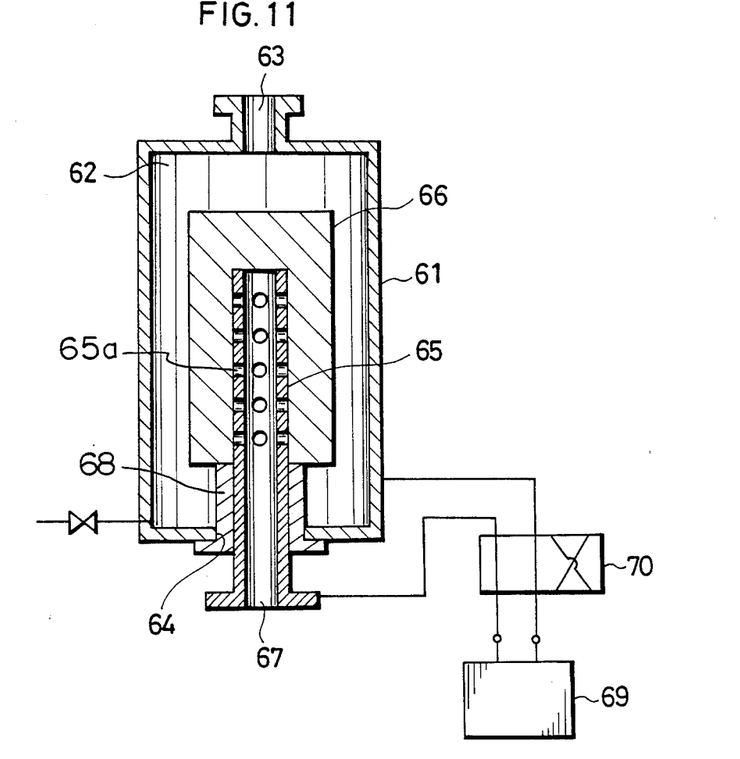
FIG. 11 is a vertical section of the apparatus itself and FIG. 12 is a radial cross-section of the apparatus itself.
Figure 12:
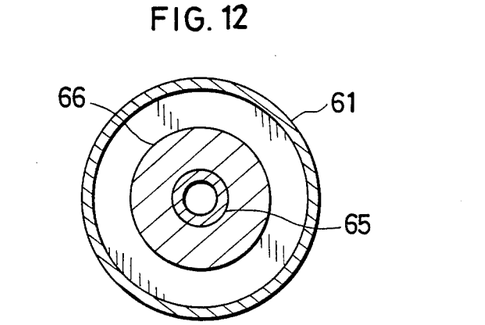

The fifth embodiment illustrated by FIGS. 11 and 12 is a modified electrostatic adsorptive fluid filtering apparatus wherein the adsorbent is placed in the electric field. This embodiment is substantially identical to the first embodiment illustrated by FIGS. 1 through 3 except that it is free from the conductor 8 surrounding the adsorbent layer 6. Specifically, in FIGS. 11 and 12, reference numeral 61 designates an outer cylindrical electrode defining therein a slow-rate treatment chamber 62 and having at vertically opposite ends thereof a inlet 63 communicating with the slow-rate treatment chamber 62 and an electrode bearing opening 64.

Reference numeral 65 designates a central electrode having a passage axially extending therethrough. The peripheral wall of this central electrode 65 is provided adjacent its upper end with a plurality of through-holes 65a and surrounded by an adsorbent layer 66 while the lower end of the central electrode 65 defines an outlet 67.

Reference numeral 68 designates an insulator carried in the electrode bearing opening 64 of the outer cylindrical electrode 61 and serving to insulate the central electrode 65 from the outer cylindrical electrode 61. The central electrode 65 is fixedly supported by the insulator 68 so that its partial length surrounded by the adsorbent layer 66 extends concentrically within the slow-rate treatment chamber 62 of the outer cylindrical electrode 61.

Reference numeral 69 designates a DC source having positive and negative terminals connected via the change-over switch 70 to the outer cylindrical electrode 61 and the central electrode 65, respectively.

The surface potential on the adsorptive holes of the adsorbent is enhanced also by placing the adsorbent in an electric field in this manner, resulting in an increase in a Coulomb's force acting on impurities contained in the fluid. Therefore, if the adsorbent carrying the adsorptive hole surface potential of a polarity opposite to that carried by the impurities to be removed is selected, and a quantity of electricity of the surface charges carried by the impurities is increased, the impurities will be exposed to the electric field acting in such a manner that the impurities are attracted towards the surface potential of the adsorptive hole to achieve the desired effect, as in the abovementioned first embodiment. Thus, impurities of relatively large particle sizes cohere together and settle down under the effect of van der Waal's force as a result of erasure of the zeta potential carried thereon while the remaining impurities which have not settled down are caused by the intensive Coulomb's force to fill the adsorptive hole and are adsorbed onto the adsorbent.

Upon saturation of the adsorbent, a cleaning fluid may be guided to flow between the electrodes while an electric field of a polarity opposite to that for adsorption is impressed on the adsorbent to dislodge the matters from the adsorbent in a repulsive manner and thereby to externally discharge the matter.

Selection of the voltage impressed from the DC source 69 across the outer cylindrical electrode 61 and the central electrode 65 is also identical to the selection for impression across the outer cylindrical electrode and the charging electrode in the first to fourth embodiments as have previously been mentioned. Further, selection of the adsorbent constituting the adsorbent layer 66 is also made just as in the respective embodiments as have been described hereinbefore.

The electrostatic adsorptive fluid filtering apparatus according to the present invention as has been described with reference to the respective embodiments permits gaseous, nonaqueous or aqueous fluid to be filtered with a high efficiency. Such electrostatic adsorptive fluid filtering apparatus may be utilized, when the fluid is gas, for air cleaning, or removal of noxious gases or ions; when the fluid is non-aqueous liquid, for regeneration or purification of oils such as lubricating oil and machining oil, organic solvents, raw oil or the like; and when the fluid is aqueous liquid, for waste water disposal, production of potable water, production of purified water or like.

Practical examples of recovery of adsorbed matters by changing over the polarity of the electric source include recovery of heavy metals contained in oil or solvent and similar recovery from waste water or sea water or the like.

An experimental apparatus has been manufactured in accordance with the present invention particularly as has been described above in accordance with the third embodiment and this electrostatic adsorptive fluid filtering apparatus has provided filtration results as set forth below:

(a) Removal of chlorine gas and submicron-sized
    particles from air;—
    Filtering conditions:
        impressed voltage—DC 5000 V/3 cm
        flow rate—0.5 m$^3$/Hr

|  | Before Treatment | After Treatment |
| --- | --- | --- |
| Chlorine | 980 ppm | 0.3 ppm |
| Degree of | 122 mg/100 ml | 0.2 mg/100 ml |

(b) Regeneration of lubricating oil (vacuum pump oil)
Filtering conditions:
adsorbent—activated clay+zeolite
quantity of, oil used—6
filter used—nominal 1.0μ, flow rate—1 l/min (1) Voltage impressed across the outer cylindrical electrode and the charging electrode - 0 V;

| Duration of treatment | 0 Hr | 5 Hr | 10 Hr | 20 Hr | 24 Hr |
| --- | --- | --- | --- | --- | --- |
| Filter pressure kg/cm$^2$ | 1.7 | 2.2 | 2.9 | 3.3 | 3.5 |
| Degree of contamination mg/100 ml | 652 | 300 | 48 | 5 | 2.5 |
| Total acid value KOHmg/g | 0.46 | 0.2 | 0.14 | 0.09 | 0.07 |
| Moisture content ppm | 248 | 126 | 96 | 86 | 78 |
| Viscosity 40 Ccst | 46.3 | | | | 45.0 |

(2) Voltage impressed across the outer cylindrical electrode and the charging electrode - DC 500 V/3 cm:

| Duration of treatment | 0 Hr | 5 Hr | 10 Hr | 20 Hr | 24 Hr |
| --- | --- | --- | --- | --- | --- |
| Filter pressure kg/cm$^2$ | 1.7 | 1.7 | 1.7 | 1.7 | 1.7 |
| Degree of contamination mg/100 ml | 652 | 26 | 3 | 0.6 | 0.2 |
| Total acid value KOHmg/g | 0.46 | 0.11 | 0.06 | 0.02 | 0.01 |
| Moisture content ppm | 248 | 105 | 80 | 72 | 65 |
| Viscosity 40 Cost | 46.3 | | | | 44.6 |

(c) Waste water disposal (single-pass treatment)
Filtering conditions:
impressed voltage—DC/AC superposed voltage 10 V/cm
adsorbent—activated carbon+zeolite
used filter—nominal 1.0 μ
flow rate—0.6 l/min

| | COD | BOD | Cd | Pb | F | Cu | SOL-Fe | n-nax | Al | Cr |
| --- | --- | --- | --- | --- | --- | --- | --- | --- | --- | --- |
| Before treat. | 90 | 79 | 0.01 | 0.25 | 25 | 0.25 | 66 | 1.0 | 1.5 | 0.05 |
| After treat. | 44 | 48 | 0.01< | 0.05< | 15 | 0.05< | 17 | 0.5< | 0.5< | 0.05< |

It will be obvious from the filtration results as set forth above that the electrostatic adsorptive fluid filtering apparatus according to the present invention permits gaseous, non-aqueous or aqueous fluid to be filtered with an extremely high efficiency. Particularly, the data as set forth in the above-mentioned result (b) clearly suggests that the efficiency with which the filtration can be achieved is substantially improved by the voltage impression across the outer cylindrical electrode and the charging electrode, as compared to the case in which such voltage impression is not effected. It is also proved by the data as set forth in (b) that said efficiency has been improved by enhancing the surface potential on the adsorptive hole of the adsorbent.

What is claimed is:

1. An electrostatic adsorptive fluid filtering apparatus, comprising:
    an outer cylindrical electrode having a fluid inlet;
    a charging electrode concentrically inserted in said outer cylindrical electrode, said charging electrode comprising a porous electric conductor formed in a double walled cylinder including concentric inner and outer walls defining a space therebetween and a hollow interior inside said inner wall, said outer cylindrical electrode and said charging electrode defining together a fluid receiving space communicating with said fluid inlet;
    an adsorbent situated in an filling said space between the inner and outer walls of the double walled cylinder;
    a central electrode axially extending within said hollow interior of said charging electrode, said central electrode comprising a pipe piece and defining a fluid outlet; and
    a source of electrical voltage connected to said outer cylindrical electrode, the charging electrode and the central electrode, wherein a voltage is impressed across said outer cylindrical electrode and said charging electrode, on one side, with the voltage on said central electrode and said outer cylindrical electrode being at the same potential and different from the potential on said charging electrode, while fluid under pressure is introduced through said inlet into said fluid receiving space, and passes through the charging electrode, the adsorbent and the central electrode to said fluid outlet.

2. An electrostatic adsorptive fluid filtering apparatus according to claim 1, further comprising:
    a filter located around the central electrode.

3. An electrostatic adsorptive fluid filtering apparatus according to claim 2, further comprising:
    a dielectric substance interposed between the outer cylindrical electrode and the charging electrode.

4. The electrostatic adsorptive fluid filtering apparatus according to claim 3, further comprising means for changing over the polarity of the voltage impressed across the charging electrode and the outer cylindrical electrode so that matter once adsorbed onto the adsorbent is discharged.

5. An electrostatic adsorptive fluid filtering apparatus according to claim 2, further comprising means for changing over the polarity of the voltage impressed across the charging electrode and the outer cylindrical electrode so that matter once adsorbed onto the adsorbent is discharged.

6. An electrostatic adsorptive fluid filtering apparatus according to claim 1, further comprising:
a dielectric substance interposed between the outer cylindrical electrode and the charging electrode.

7. An electrostatic adsorptive fluid filtering apparatus according to claim 6, further comprising means for changing over the polarity of the voltage impressed across the charging electrode and the outer cylindrical electrode so that matter once adsorbed onto the adsorbent is discharged.

8. An electrostatic adsorptive fluid filtering apparatus according to claim 1, further comprising means for changing over the polarity of the voltage impressed across the charging electrode and the outer cylindrical electrode so that matter once adsorbed onto the adsorbent is discharged.

9. An electrostatic adsorptive fluid filtering apparatus as defined in claim 1, further wherein the source of electrical voltage is a DC source.

10. An electrostatic adsorptive fluid filtering apparatus as defined in claim 1, further wherein the source of electrical voltage is a DC/AC source.

* * * * *